United States Patent [19]
Zinnes et al.

[11] 3,868,379
[45] *Feb. 25, 1975

[54] HETEROCYCLIC AMIDES OF 4-HYDROXY-2H-1-BENZOTHIOPYRAN-3-CARBOXYLIC ACID 1,1-DIOXIDE

[75] Inventors: Harold Zinnes, Rockaway; Neil A. Lindo, Chatham, both of N.J.

[73] Assignee: Warner-Lambert Company, Morris Plains, N.J.

[ * ] Notice: The portion of the term of this patent subsequent to Oct. 30, 1990, has been disclaimed.

[22] Filed: June 21, 1973

[21] Appl. No.: 372,440

Related U.S. Application Data

[63] Continuation-in-part of Ser. No. 248,509, April 28, 1972, Pat. No. 3,769,292.

[52] U.S. Cl. .............. 260/294.8 C, 260/256.4 N, 260/307 H, 260/306.8 R, 260/327 TH, 424/251, 424/266, 424/270, 424/272, 424/275
[51] Int. Cl. ............................................ C07d 31/50
[58] Field of Search .......................... 260/294.8 C

[56] References Cited
UNITED STATES PATENTS
| | | | |
|---|---|---|---|
| 3,133,918 | 5/1964 | MacPhillamy et al. | 260/294.8 C |
| 3,163,645 | 12/1964 | DeStevens et al. | 260/294.8 C |
| 3,769,292 | 10/1973 | Zinnes et al. | 260/294.8 C |

*Primary Examiner*—Alan L. Rotman
*Attorney, Agent, or Firm*—Albert H. Graddis; Frank S. Chow; George M. Yahwak

[57] ABSTRACT

Compounds of the formula

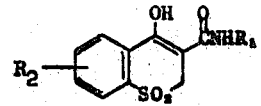

I wherein $R_1$ is an aromatic heterocyclic group and $R_2$ is hydrogen, alkyl, aralkyl, alkoxy, halogen, cyano, nitro, trifluoromethyl, etc., are disclosed. These compounds are useful as anti-inflammatory agents.

2 Claims, No Drawings

HETEROCYCLIC AMIDES OF 4-HYDROXY-2H-1-BENZOTHIOPYRAN-3-CARBOXYLIC ACID 1,1-DIOXIDE

The present invention is concerned with novel heterocyclic amides of 4-Hydroxy-2H-1-benzothiopyran-3-carboxylic acid 1,1-dioxide and the process for their production, having the following structural formula:

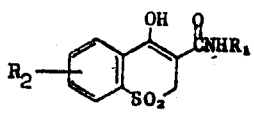

I wherein $R_1$ is an aromatic heterocyclic group such as pyridyl, pyrimidyl, thiazolyl, isoxazolyl,, furyl, thienyl and the like and $R_2$ is hydrogen, alkyl, aryl, aralkyl, alkoxy, halogen, cyano, nitro, or trifluoromethyl and the like. The aromatic heterocyclic group may also be substituted by groups such as alkyl, aryl, aralkyl, alkoxy, halogen, cyano, nitro, trifluoromethyl and the like.

The present invention also encompasses within its scope a novel process for the production of the above compounds.

The compounds of this invention are useful as antiinflammatory agents. For example, when they are administered orally or intraperitoneally to laboratory animals such as rats, at a dose of 10–200 mg/kg, they reduce the swelling in the paw which had been previously induced by injection of an irritant such as carrageenin.

These compounds are indicated in conditions where the soft tissues are inflamed, such as in rheumatoid arthritis. A dose of 10–200 mg/kg in several divided doses daily orally or by injection is recommended.

In order to use these compounds, they are formulated with pharmaceutical diluents such as lactose and compounded into dosage forms such as tablets. Alternatively, they can be formulated with a sterile vehicle such as water for injection and compounded into suspensions suitable for parenteral administration. Since these compounds are acids they can be converted to metal or amine salts and the like. The pyridyl compounds are amphoteric. Thus they can also form acid addition salts. These salts are formed by conventional procedures, e.g., by treating the compound with an alkali such as sodium or potassium hydroxide and then recovering the salts.

According to the present invention, the above compounds are prepared by subjecting a β-ketoester having the following structural formula to aminolysis:

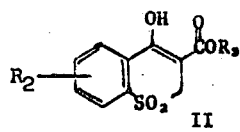

II wherein $R_3$ is aryl or alkyl. This process is desirably carried out by refluxing said compound II with an amine of the formula $R_1NH_2$ in an inert solvent such as xylene in the presence of a molecular sieve. The molecular sieve serves to remove the alcohol which is formed in the reaction.

The starting compound II is prepared in accordance with the description set forth in W. J. Still, et. al., J.O.C., 33, 2730 (1968). In order to further illustrate the practice of the invention, the following example is included:

EXAMPLE 1

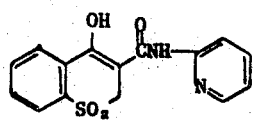

4-Hydroxy-N-(2-pyridyl)-2H-1-benzothiopyran-3-carboxamide 1,1-Dioxide

A mixture of 9.4 g. (0.04 mole) of methyl 4-hydroxy-2H-1-benzothiopyran-3-carboxylate 1,1-dioxide, 5.2 g. (0.06 mole) of 2-aminopyridine, and 250 ml. of xylene was refluxed for 16 hr. in a Soxhlet apparatus, the thimble of which contained 20 g. of Linde type 4A molecular sieve. The mixture was cooled to room temperature and the resulting crystalline precipitate (wgt. 8.6 g.; mp. 236°–238° dec.) was collected. It was recrystallized from acetic acid to give 6.4 g. of material, mp. 236°–238° dec.

Anal. Calcd for $C_{15}H_{12}N_2O_4S$: C, 56.95; H, 3.82; N, 8.86; S, 10.14. Found: C, 56.70; H, 3.77; N, 8.73; S, 10.39.

EXAMPLE 2

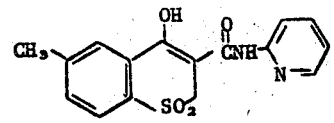

4-Hydroxy-6-methyl-N-(2-pyridyl)-2H-1-benzothiopyran-3-carboxamide 1,1-Dioxide

A mixture of 10.7 g (0.04 mol) of methyl 4-hydroxy-6-methyl-2H-1-benzothiopyran-3-carboxylate, 5.6 g (0.06 mol) of 2-aminopyridine, and 250 ml of xylene was refluxed for 16 hr in a Soxhlet apparatus, the thimble of which contained 20 g of Linde type 4A molecular sieve. The reaction mixture was cooled to room temperature and the resulting crystalline precipitate was collected and recrystallized from acetic acid to give 9.4 g of product; mp 236°–239°dec.

Anal. Calcd for $C_{16}H_{14}N_2O_4S$: C, 58.17; H, 4.27; N, 8.48; S, 9.71. Found: C, 58.00; H, 4.25; N, 8.30; S, 9.55.

EXAMPLE 3

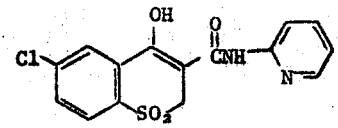

6-Chloro-4-hydroxy-N-(2-pyridyl)-2H-1-benzothiopyran-3-carboxamide 1,1-Dioxide

The same procedure was employed, using 11.5 g (0.04 mol) of methyl 6-chloro-4-hydroxy-2H-1-benzothiopyran-3-carboxylate 1,1-dioxide and a reaction time of 3.5 hr. The precipitate which separated from the reaction mixture was collected and recrystallized from acetic acid to give 9.3 g of product; mp 239°–242°dec.

Anal. Calcd for $C_{15}H_{11}ClN_2O_4S$: C, 51.36; H, 3.16; Cl, 10.11, N, 7.99; S, 9.14. Found: C, 51.28; H, 3.13; Cl, 10.41; N, 8.21; S, 9.33.

We claim:

1. 4-hydroxy-6-methyl-N-(2-pyridyl)-2H-1-benzothiopyran-3-carboxamide-1,1-dioxide.
2. 6-chloro-4-hydroxy-N-(2-pyridyl)-2H-1-benzothiopyran-3-carboxamide-1,1-dioxide.

* * * * *